(12) United States Patent
Zhu et al.

(10) Patent No.: US 8,837,368 B2
(45) Date of Patent: Sep. 16, 2014

(54) TRANSMISSION METHOD OF FEMTOCELL

(75) Inventors: Ling Zhu, Su Zhou (CN); Chao-Yang Sun, Su Zhou (CN)

(73) Assignee: Sernet (Suzhou) Technologies Corporation, Jiangsu (CN)

(*) Notice: Subject to any disclaimer, the term of this patent is extended or adjusted under 35 U.S.C. 154(b) by 160 days.

(21) Appl. No.: 13/528,949

(22) Filed: Jun. 21, 2012

(65) Prior Publication Data

US 2012/0327853 A1 Dec. 27, 2012

(30) Foreign Application Priority Data

Jun. 24, 2011 (CN) .......................... 2011 1 0171434

(51) Int. Cl.
| | |
|---|---|
| H04W 4/00 | (2009.01) |
| H04L 12/66 | (2006.01) |
| H04J 3/06 | (2006.01) |
| H04B 7/00 | (2006.01) |
| H04L 29/06 | (2006.01) |
| H04W 28/14 | (2009.01) |
| H04W 84/04 | (2009.01) |

(52) U.S. Cl.
CPC .......... *H04L 65/608* (2013.01); *H04W 84/045* (2013.01); *H04L 65/80* (2013.01); *H04W 28/14* (2013.01)
USPC ........... 370/328; 370/352; 370/509; 370/512; 370/514; 455/502

(58) Field of Classification Search
CPC ................ H04L 29/016176; H04L 12/2684; H04L 29/06517
USPC ........... 370/352, 509, 512, 514, 349; 455/502
See application file for complete search history.

(56) References Cited

U.S. PATENT DOCUMENTS

| | | | | |
|---|---|---|---|---|
| 7,738,506 | B1 * | 6/2010 | Bergstrom | 370/509 |
| 2005/0005205 | A1 * | 1/2005 | Shiue et al. | 714/700 |
| 2005/0007989 | A1 * | 1/2005 | Wittmann | 370/349 |
| 2010/0040037 | A1 * | 2/2010 | Choi et al. | 370/345 |
| 2010/0315995 | A1 * | 12/2010 | Bloomfield et al. | 370/328 |
| 2012/0008641 | A1 * | 1/2012 | Stoica et al. | 370/465 |

* cited by examiner

*Primary Examiner* — Edan Orgad
*Assistant Examiner* — Rebecca Song
(74) *Attorney, Agent, or Firm* — McClure, Qualey & Rodack, LLP

(57) ABSTRACT

A transmission method of a femtocell includes the following steps. The femtocell receives and temporarily stores multiple real-time transport protocol (RTP) packets from a UE in a buffer. When the RTP packets are temporarily stored for a time period, the femtocell samples the buffer at a sampling rate to generate multiple CS data packets. The CS data packets include a current CS data packet. When there exists no previous CS data packet received from the UE, the femtocell calculates a timestamp of the current CS data packet according to a current timestamp. When there exists the previous CS data packet, the femtocell calculates the timestamp of the current CS data packet according to the timestamp and a connection frame number (CFN) of the previous CS data packet and a CFN of the current CS data packet.

7 Claims, 2 Drawing Sheets

TRANSMISSION METHOD OF FEMTOCELL

This application claims the benefit of People's Republic of China application Serial No. 201110171434.4, filed Jun. 24, 2011, the subject matter of which is incorporated herein by reference.

BACKGROUND

1. Technical Field

The invention relates in general to a transmission method of a femtocell.

2. Background

A femtocell logins a core network via the Internet. The network environment of the Internet causes the data transmission suffering un-predictable jitters or packet losses, so that real-time transport protocol (RTP) packets transmitted between the femtocell and a gateway via the Internet also suffer jitters or packet losses. Due to the hard real-time of the third generation network, the RTP packets suffering jitters or packet losses will be transmitted to the mobile devices and displayed to users directly in audio or video forms, and the users will listen to distorted voices or views frames with mosaic. Consequently, it seriously influences the users' sensations and operators' reputations.

SUMMARY

The disclosure is directed to a transmission method of a femtocell, utilizing the femtocell to adjust real-time transport protocol (RTP) packets to be circuit switched (CS) data packets with relatively correct time delay and no packet lost to transmit to a UE.

According to a first aspect of the present disclosure, a transmission method of a femtocell including the following steps is provided. The femtocell receives and temporarily stores multiple RTP packets from the Internet in a buffer. When the RTP packets are temporarily stored for a time period, the femtocell samples the buffer at a sampling rate to generate multiple CS data packets, and records multiple timestamps of the CS data packets. The CS data packets include a current CS data packet. When there exists no previous CS data packet transmitted to a user equipment (UE), the femtocell calculates a connection frame number (CFN) of the current CS data packet according to a current CFN. When there exists the previous CS data packet, the femtocell calculates the CFN of the current CS data packet according the CFN and the timestamp of the previous CS data packet, and the timestamp of the current CS data packet. The femtocell transmits the current CS data packet and the CFN of the current CS data packet to the UE.

According to a second aspect of the present disclosure, a transmission method of a femtocell including the following steps is provided. The femtocell receives and temporarily stores multiple RTP packets from a UE in a buffer. When the RTP packets are temporarily stored for a time period, the femtocell samples the buffer at a sampling rate to generate multiple CS data packets. The CS data packets include a current CS data packet. When there exists no previous CS data packet received from the UE, the femtocell calculates a timestamp of the current CS data packet according to a current timestamp. When there exists the previous CS data packet, the femtocell calculates the timestamp of the current CS data packet according to the timestamp and a CFN of the previous CS data packet and a CFN of the current CS data packet.

The invention will become apparent from the following detailed description of the preferred but non-limiting embodiments. The following description is made with reference to the accompanying drawings.

DETAILED DESCRIPTION OF THE INVENTION

The disclosure proposes a transmission method of a femtocell, utilizing the femtocell to regulate real-time transport protocol (RTP) packets to be circuit switched (CS) data packets with the stable rate and to make up the packets automatically, thus capable of optimizing the whole signal transmission quality of the femtocell.

Figure 1:
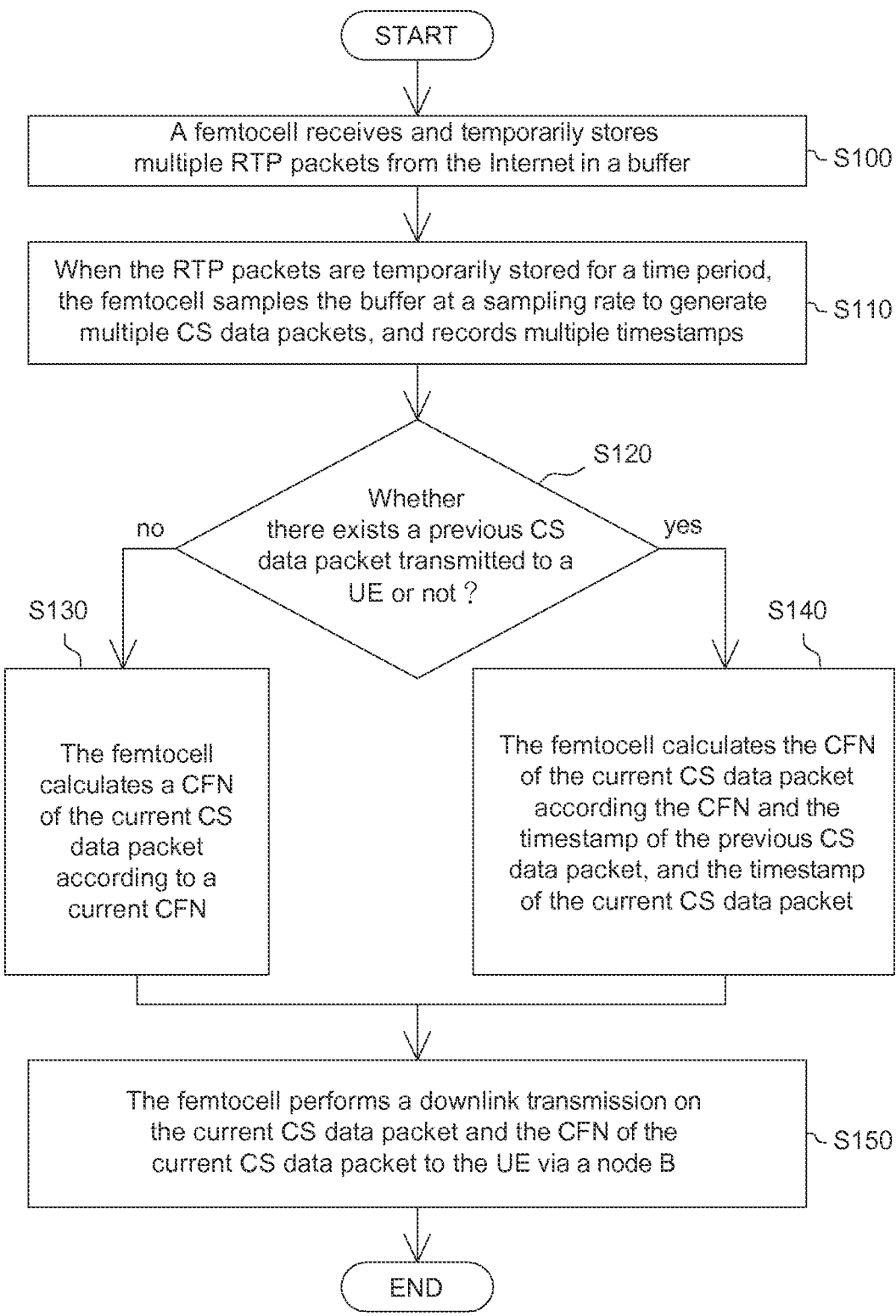
FIG. 1 shows a flow chart of a transmission method of a femtocell according to an embodiment.

Referring to FIG. 1, a flow chart of a transmission method of a femtocell according to an embodiment is shown. In step S100, the femtocell receives and temporarily stores multiple RTP packets from the Internet in a buffer. The femtocell substantially can create the buffer first and set the buffer as being written-only. After that, when the buffer has been written for a time period, the femtocell can set the buffer again as being readable. The time period is adjustable according to the quality of the current network. Corresponding to the general home networking, the time period is, for example, 500 ms, but it is not limited thereto. The time period should not be too long for preventing the corresponding user equipment (UE) from actively stopping business due to over huge delay.

In step S110, when the RTP packets are temporarily stored for the time period, the femtocell samples the buffer at a sampling rate to generate multiple CS data packets, and records multiple timestamps of the CS data packets. The CS data packets include a current CS data packet. When the RTP packets correspond to audio data, the sampling rate is such as 20 ms per sampling. When there obtains data by sampling the buffer, the femtocell generates a corresponding CS data packet; when there obtains no data by sampling the buffer, the femtocell generates a null packet as the corresponding CS data packet.

Likewise, when the RTP packets correspond to video data, the sampling rate is such as 20 ms per sampling or 10 ms per sampling. When the sampling rate is 20 ms per sampling, the CS data packets are generated as described above. When the sampling rate is 10 ms per sampling, the femtocell takes each data sampled from the buffer as a sub-packet, and merges every two sub-packets into a CS data packet. That is, each of the CS data packets includes a first sub-packet and a second sub-packet, and the timestamp of the first sub-packet is recorded as the timestamp of the CS data packet. In addition, when there obtains no data by sampling the buffer, the femtocell generates a null packet as the corresponding sub-packet.

Due to the creation of the buffer, the femtocell can automatically regulate the RTP packets, having possible jitters and received from the Internet, to be downlink CS data packets with the essentially stable rate without a Home Node B Gateway (HNBGW). Furthermore, the femtocell can wisely make up the packets, thus the packet loss problems caused by the Internet may be solved and the continuity of the downlink CS data packets is kept. In conclusion, a mean opinion score (MOS) value of the audio or video data provided by the femtocell may come to 3 or 4, higher than a conventional MOS value, 2.

Then, in step S120, whether there exists a previous CS data packet transmitted to a UE or not is determined. When there exists no previous CS data packet, in step S130, the femtocell calculates a connection frame number (CFN) of the current CS data packet according to a current CFN. Assume that the previous CS data packet is A, the current CS data packet is B, CFN(X) is the CFN of the CS data packet X, and the current CFN is CUR_CFN( ) The CFN of the current CS data packet B in step S130 can be obtained from the equation (1).

$$CFN(B)=(CUR\_CFN(\ )+2) \bmod 256 \qquad \text{eq. (1)}$$

When there exists the previous CS data packet, in step S140, the femtocell calculates the CFN of the current CS data packet according the CFN and the timestamp of the previous CS data packet, and the timestamp of the current CS data packet. Assume that the previous CS data packet is A, the current CS data packet is B, CFN(X) is the CFN of the CS data packet X, T(X) is the timestamp of the CS data packet X, and J is the timestamp jitter of the CS data packet transmitted from the core network to femtocell. The CFN of the current CS data packet B can be obtained from the equation (2).

$$CFN(B)=(CFN(A)+((T(B)-T(A)+J)/160)) \bmod 256 \qquad \text{eq. (2)}$$

Afterwards, in step S150, the femtocell performs a downlink transmission on the current CS data packet and the CFN of the current CS data packet to the UE via a node B.

Figure 2:
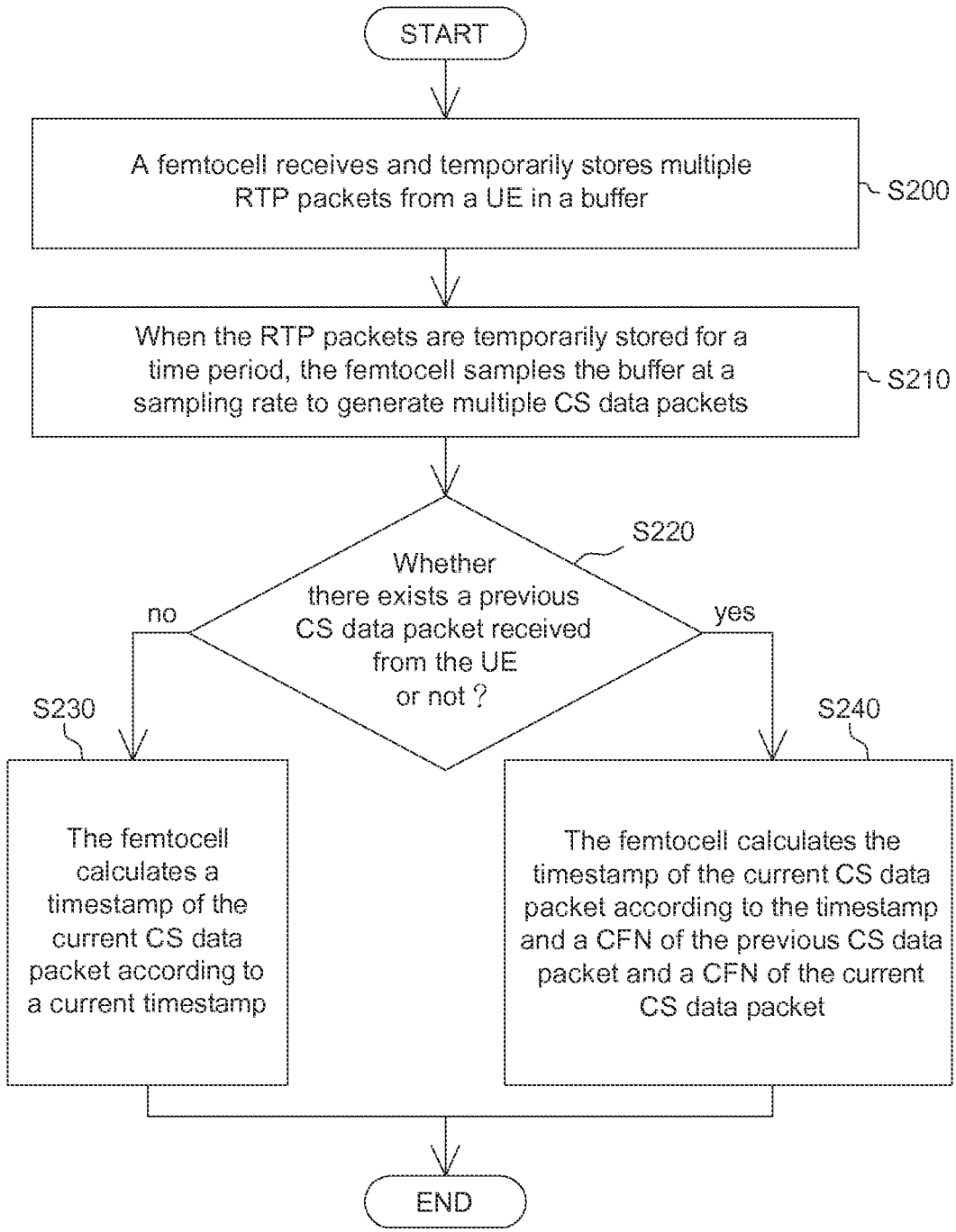
FIG. 2 shows a flow chart of a transmission method of a femtocell according to another embodiment.

In addition, the disclosure also proposes a transmission method of a femtocell capable of optimizing uplink CS data packets of a UE. Referring to FIG. 2, a flow chart of a transmission method of a femtocell according to another embodiment is shown. In step S200, the femtocell receives and temporarily stores multiple RTP packets from the UE in a buffer. The femtocell substantially can create the buffer first and set the buffer as being written-only. After that, when the buffer has been written for a time period, the femtocell can set the buffer again as being readable.

When the RTP packets correspond audio data, the RTP packets can be directly stored in the buffer. On the other hand, when the RTP packets correspond to video data, the femtocell processes the RTP packets according to a sampling rate of the core network. When the sampling rate of the core network is 20 ms per sampling, the RTP packets can be directly stored in the buffer; when the sampling rate of the core network is 10 ms per sampling, each RTP packet is fragmented into a first sub RTP packet and a second sub RTP packet. The CFN of the first sub RTP packet is set to be equal to the CFN of the RTP packet; the CFN of the second sub RTP packet is set to be equal to the CFN of the RTP packet plus 1 then mod 256. Then the two sub RTP packets of each RTP packet are sequentially stored in the buffer.

In step S210, when the RTP packets are temporarily stored for a time period, the femtocell samples the buffer at a sampling rate to generate multiple CS data packets. The CS data packets include a current CS data packet. The time period is such as 500 ms. Next, in step S220, whether there exists a previous CS data packet received from the UE or not is determined.

When there exists no previous CS data packet, in step S230, the femtocell calculates a timestamp of the current CS data packet according to a current timestamp. Assume that the current CS data packet is B, T(X) is the timestamp of the CS data packet X, and the current timestamp is CUR_TIME( ). The timestamp T(B) of the current CS data packet B in step S230 can be obtained from the equation (3).

$$T(B)=CUR\_TIME(\ ) \qquad \text{eq. (3)}$$

When there exists the previous CS data packet, in step S240, the femtocell calculates the timestamp of the current CS data packet according to the timestamp and a CFN of the previous CS data packet and a CFN of the current CS data packet. Assume that the previous CS data packet is A, the current CS data packet is B, CFN(X) is the CFN of the CS data packet X, T(X) is the timestamp of the CS data packet X, and J is the timestamp jitter. The timestamp T(B) of the current CS data packet B can be obtained from the equation (4).

$$T(B)=T(A)+((256+CFN(B)-CFN(A)) \bmod 256) \times 160 \qquad \text{eq. (4)}$$

The transmission method of a femtocell proposed in the above embodiments of the disclosure sets delay and makes up the packets automatically, so that the femtocell can regulate RTP packets from the Internet to be correct CS data packets with the stable rate and no packet loss, thus capable of optimizing the whole signal transmission quality between the femtocell and the UE. Besides, the transmission method of a femtocell proposed in the disclosure can not only calculate the corresponding CFN of the downlink CS data packet according to the timestamp of the RTP packet, but also transform the CFN of the uplink CS data packet into the timestamp.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transmission method of a femtocell, comprising:
   receiving and temporarily storing a plurality of real-time transport protocol (RTP) packets from the Internet in a buffer by the femtocell;
   sampling the buffer at a sampling rate to generate a plurality of circuit switched (CS) data packets, and recording a plurality of timestamps of the CS data packets by the femtocell when the RTP packets are temporarily stored for a time period, wherein the CS data packets include a current CS data packet;
   calculating a connection frame number (CFN) of the current CS data packet according to a current CFN by the femtocell when there exists no previous CS data packet transmitted to a user equipment (UE);
   calculating the CFN of the current CS data packet according to the CFN and the timestamp of the previous CS data packet, and the timestamp of the current CS data packet by the femtocell when there exists the previous CS data packet; and
   transmitting the current CS data packet and the CFN of the current CS data packet to the UE by the femtocell.

2. The transmission method according to claim 1, wherein when the femtocell samples the buffer and obtains no data, the femtocell generates a null packet as the CS data packet.

3. The transmission method according to claim 1, wherein assume that the previous CS data packet is A, the current CS data packet is B, CFN(X) is the CFN of the CS data packet X, and the current CFN is CUR_CFN( ), the CFN of the current CS data packet B is CFN(B)=(CUR_CFN( )+2) mod 256 when the previous CS data packet A does not exist.

4. The transmission method according to claim 1, wherein assume that the previous CS data packet is A, the current CS data packet is B, CFN(X) is the CFN of the CS data packet X, T(X) is the timestamp of the CS data packet X, and J is the timestamp jitter, the CFN of the current CS data packet B is CFN(B)=(CFN(A)+((T(B)−T(A)+J)/160)) mod 256 when the previous CS data packet A exists.

5. The transmission method according to claim 1, wherein the femtocell samples the buffer at the sampling rate to obtain a first sub-packet and a second sub-packet, merges the first sub-packet and the second sub-packet into the CS data packet, and records the timestamp of the first sub-packet as the timestamp of the CS data packet.

6. A transmission method of a femtocell, comprising:
    receiving and temporarily storing a plurality of real-time transport protocol (RTP) packets from a user equipment (UE) in a buffer by the femtocell;
    sampling the buffer at a sampling rate to generate a plurality of circuit switched (CS) data packets by the femtocell when the RTP packets are temporarily stored for a time period, wherein the CS data packets include a current CS data packet;
    calculating a timestamp of the current CS data packet according to a current timestamp by the femtocell when there exists no previous CS data packet received from the UE;
    calculating the timestamp of the current CS data according to the timestamp and a connection frame number (CFN) of the previous CS data packet and a CFN of the current CS data packet by the femtocell when there exists the previous CS data packet; and
    transmitting the current CS data packet and the timestamp of the current CS data packet to the UE by the femtocell,
    wherein assume that the previous CS data packet is A, the current CS data packet is B. CFN(X) is the CFN of the CS data packet X, T(X) is the timestamp of the CS data packet X, and J is the timestamp litter, the timestamp of the current CS data packet B is T(B)=T(A)+((256+CFN(B)−CFN(A))mod 256)×160 when the previous CS data packet A exists.

7. The transmission method according to claim 6, wherein assume that the current CS data packet is B, T(X) is the timestamp jitter of the CS data packet X, and the current timestamp is CUR_TIME( ), the timestamp of the current CS data packet B is T(B)=CUR_TIME( ) when the previous CS data packet does not exist.

* * * * *